United States Patent [19]

Ganguli

[11] 4,454,240

[45] Jun. 12, 1984

[54] CATALYST REGENERATION PROCESS INCLUDING METAL CONTAMINANTS REMOVAL

[75] Inventor: Partha S. Ganguli, Lawrenceville, N.J.

[73] Assignee: HRI, Inc., Gibbsboro, N.J.

[21] Appl. No.: 317,216

[22] Filed: Nov. 2, 1981

[51] Int. Cl.³ .................... B01J 23/94; B01J 23/92; C10G 1/06; C01G 31/00
[52] U.S. Cl. ........................... 502/26; 208/10; 208/143; 423/68; 423/82; 423/150; 423/157; 502/25; 502/27; 502/28
[58] Field of Search .............. 252/413, 414, 416, 419, 252/420; 208/216 K, 10, 143

[56] References Cited

U.S. PATENT DOCUMENTS

| 2,704,281 | 3/1955 | Appell | 252/413 |
| 3,220,956 | 11/1965 | Cramer et al. | 252/413 |
| 3,562,150 | 2/1971 | Hamilton et al. | 252/412 |
| 3,791,989 | 2/1974 | Mitchell et al. | 252/413 |
| 3,839,191 | 10/1974 | Johnson | 252/420 |
| 4,007,131 | 2/1977 | Gillespie et al. | 252/419 |
| 4,089,806 | 5/1978 | Farrell et al. | 252/413 |
| 4,267,032 | 5/1981 | Burk, Jr. et al. | 252/413 |
| 4,268,415 | 5/1981 | Mohan et al. | 252/413 |
| 4,301,125 | 11/1981 | Burkin et al. | 423/150 |

Primary Examiner—P. E. Konopka
Attorney, Agent, or Firm—Mallare, V. A.; F. A. Wilson

[57] ABSTRACT

Spent catalysts removed from a catalytic hydrogenation process for hydrocarbon feedstocks, and containing undesired metals contaminants deposits, are regenerated. Following solvent washing to remove process oils, the catalyst is treated either with chemicals which form sulfate or oxysulfate compounds with the metals contaminants, or with acids which remove the metal contaminants, such as 5–50 W % sulfuric acid in aqueous solution and 0–10 W % ammonium ion solutions to substantially remove the metals deposits. The acid treating occurs within the temperature range of 60°–250° F. for 5–120 minutes at substantially atmospheric pressure. Carbon deposits are removed from the treated catalyst by carbon burnoff at 800°–900° F. temperature, using 1–6 V % oxygen in an inert gas mixture, after which the regenerated catalyst can be effectively reused in the catalytic process.

6 Claims, 2 Drawing Figures

CATALYST REGENERATION PROCESS INCLUDING METAL CONTAMINANTS REMOVAL

BACKGROUND OF INVENTION

This invention pertains to catalyst regeneration to remove deposited metal contaminants, and pertains particularly to a regeneration process for removal of such metal deposits and carbon from spent catalysts using chemical treatment, followed by carbon burnoff.

In coal catalytic liquefaction and hydrogenation processes, the used or spent catalyst gradually becomes contaminated by deposits of metals such as iron, titanium, calcium, sodium, silicon, etc. from the coal. These compounds form a crust around the exterior surface of the catalyst and thereby limit the diffusion of hydrocarbon molecules into the catalyst pores. Partial removal of these contaminants, particularly iron, titanium, calcium and sodium, is an essential step towards regeneration and reuse of the spent catalyst. Also, in catalytic hydroconversion processes for petroleum, tar sands bitumen, or shale oil, contaminants such as iron, nickel and vanadium are deposited on the catalyst and thereby reduces its activity appreciably which requires catalyst replacement. Because of the high costs of such catalysts, processes to successfully regenerate the spent catalysts have been sought. Although some processes for carbon burn-off from used catalysts have been developed, suitable processes for the successful removal of deposited metal contaminants were apparently not available until now.

SUMMARY OF INVENTION

This invention discloses a process for substantial removal of metal contaminants deposits from used or spent catalysts, without appreciably affecting the active metal elements in the catalyst or its support material. In the process, spent catalyst is washed with a solvent to remove process oils, and is then treated with such chemicals that convert the contaminant metals to their respective sulfate or oxysulfate compounds, or with acids which remove the metal contaminants such as dilute sulfuric acid, to remove the metal deposits. The treated catalyst is then washed to remove the acid and chemical compounds, and dried to remove surface liquid.

DESCRIPTION OF INVENTION

This invention provides a catalyst regeneration process which substantially removes metal contaminants deposits from the spent catalyst particles without damaging the active metal elements of the catalyst. In the process the spent catalyst is first washed with a hydrocarbon solvent, then is chemically treated preferably with an acid such as dilute sulfuric acid, at such conditions that convert the metal contaminants such as iron, titanium, calcium, sodium, silcon, vanadium, and nickel compounds deposited on the catalyst to their respective sulfate or oxysulfate compounds, but do not react appreciably with the active metal oxides such as cobalt, molybdenum in the catalyst or with the catalyst support material. These sulfate and oxysulfate compounds are then removed by dissolution in a suitable polar solvent, such as water. Useful chemical treating compounds include ammonium peroxydisulfate and peroxy sulfate compounds. Useful inorganic and organic acids include sulfuric acid, sulfonic acid, nitric acid, acetic acid, and citric acid, with 5-50 W % sulfuric acid in aqueous solution being preferred. The catalyst treating temperature used is within the range of 60°-250° F., and the treatment time is at least about 5 minutes and usually should not exceed about 120 minutes for effective removal of the metal deposits.

According to the invention, any of the following three catalyst treating procedures can be utilized:

1. Treatment of oil-free spent catalyst with 5-50 W % aqueous sulfuric acid solution at 60° to 250° F. temperature.
2. Treatment of oil-free spent catalyst with 5-50 W % sulfuric acid solution and 0-10 W % ammonium ion at 60° to 250° F.
3. Treatment of oil-free spent catalyst with 5-20 W % dilute aqueous solution of ammonium peroxydisulfate at mild operating conditions of 60°-150° F. temperature.

Procedures 1 and 2 can be used for removal of metals deposition from used catalysts removed from either coal or petroleum hydrogenation processes, whereas procedure 3 is used mainly for removal of nickel and vanadium deposits resulting from the hydroconversion of petroleum feedstock containing such metal contaminants.

After removal of substantially all metal contaminant deposits from catalyst particles has occurred, the flow of acid treating liquid is stopped and the catalyst is then washed preferably with water to remove the acid. Suitable washing procedures include passing water upwardly through the catalyst bed, or using mechanical stirring while passing the water through the catalyst bed. The catalyst is then usually dried at moderate temperatures of 200°-300° F.

The treated catalyst is preferably further regenerated by carbon burnoff. The catalyst is passed to a carbon removal step, wherein it is heated to temperature of 800°-850° F. in the presence of an oxygen-containing gas, such as 1-6% oxygen in an inert gas mixture, to effectively burn off substantially all the carbon deposits. The regenerated catalyst is then returned to the hydrogenation process for reuse, thus reducing the amount of fresh make-up catalyst required in the reaction process.

This catalyst regeneration procedure is particularly useful for recovering used catalyst from fluidized catalyst bed reaction systems, e.g. H-Oil TM and H-Coal TM hydrogenation processes using ebullated bed reactors, from fixed catalytic bed reaction systems, and also from fluid catalytic cracking (FCC) processes. The preferred feedstocks are petroleum and coal. The regenerated catalyst has activity essentially equal to fresh catalyst.

DESCRIPTION OF PREFERRED EMBODIMENT

Figure 1:
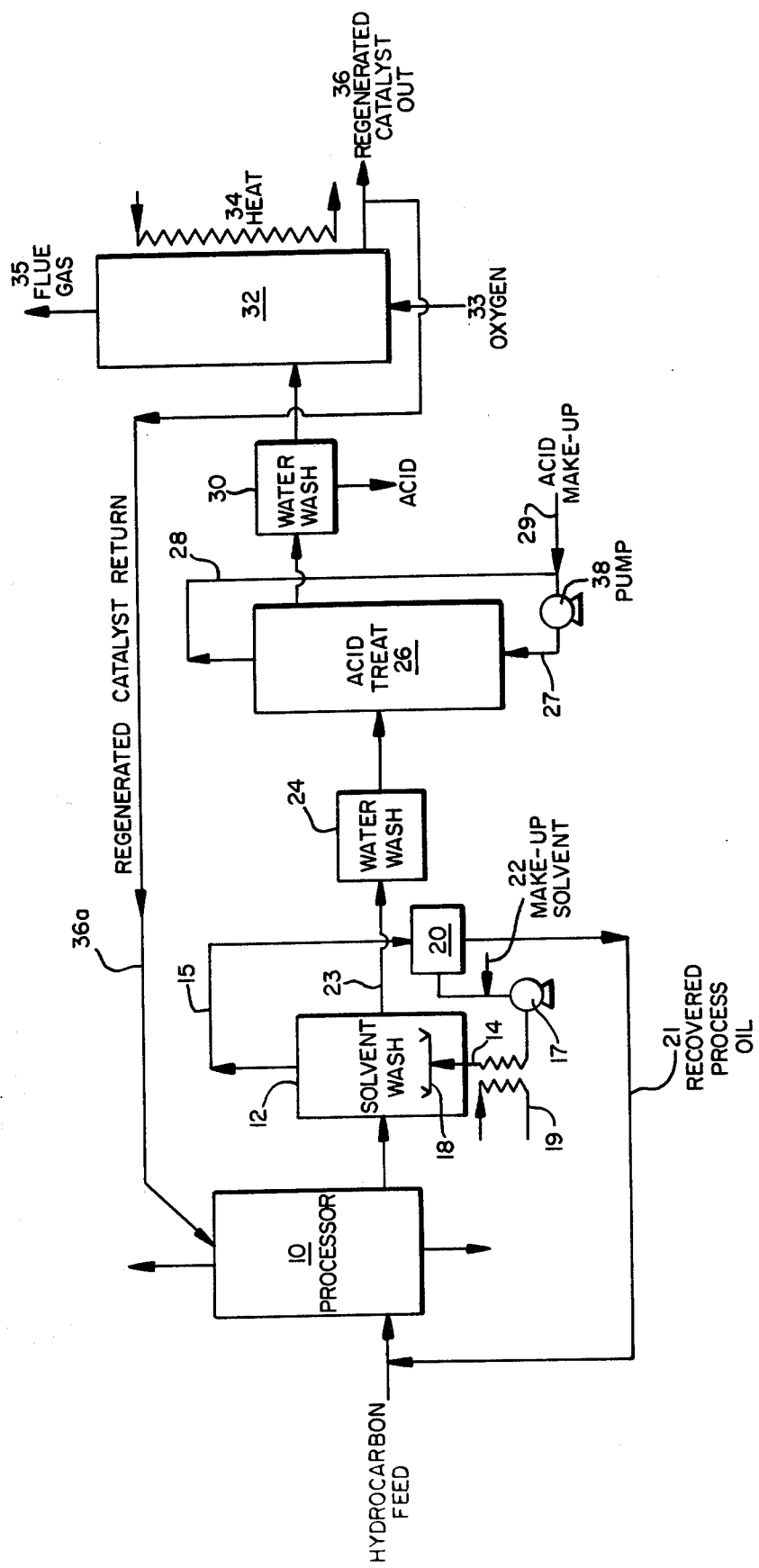
FIG. 1 is a schematic flow diagram for catalyst regeneration, showing catalyst removal from a reaction process, followed by catalyst chemical treatment and carbon burn-off steps.

As shown in FIG. 1, used catalyst particles contaminated with deposited metal impurities such as iron, titanium, calcium, sodium, nickel and vanadium, are removed from a fluidized or fixed bed reaction process 10, such as from the catalytic hydrogenation of coal, petroleum, tar sands bitumen, or shale oil. The used catalyst is introduced as a batch into catalyst washing unit 12. This unit is supplied at 14 with a solvent liquid, which is circulated uniformly upwardly through a generally vertical column 16 by pump 17 and flow distributor 18. Heat is added to the solvent at 19 as needed to maintain the solvent temperature at near its boiling point, such as 200°–300° F., depending on the solvent used. Useful solvents are naphtha, toluene, and mixtures thereof. The pressure used is preferably atmospheric.

The solvent liquid containing some heavy process oil overflows at 15 and the process oil fraction is removed at 20 for return at 21 to the hydrogenation process 10. The remaining solvent liquid, along with make-up solvent at 22 as needed, is returned to the washing step 12. Following solvent washing at 12, the catalyst bed is usually heated to a temperature sufficient to drive off the remaining solvent, which is recovered.

The used oil-free catalyst is removed at 23 from washing unit 12 is next preferably washed at 24 with water to substantially fill the catalyst pores. The wet catalyst is next passed to acid treating column 26 and dilute sulfuric acid solution, containing 15–25% sulfuric acid, is introduced at 27 into the lower portion of the column 26. The resulting catalyst bed expansion is usually about 5–50 percent of its settled height. The acid treating vessel 26 is made corrosion-resistant, such as being lined with glass or rubber. The acid solution overflows at 28 and is recycled by pump 38 to the bottom of the vessel 26, along with make-up acid at 29 as needed to maintain the desired concentration therein. The acid treatment temperature is preferably 150°–200° F.

After such acid treatment to remove metal deposits has been completed, preferably within 10–30 minutes depending upon the amount of metal deposits on the catalyst particles, the chemicals or acid used, and temperature of the treatment, the acid-treated catalyst particles are removed and water washed at 30 to remove the acid.

The acid-treated catalyst next preferably undergoes further regeneration by carbon burnoff treatment in a fixed or fluidized bed with an oxygen-containing combustion gas which is preferably introduced at the bottom as generally shown in FIG. 1. This further regeneration step is accomplished in combustor 32 to remove substantially all carbon deposits by carbon burnoff, using a combustion gas having suitably low oxygen content, such as 1–6 V % oxygen with the remainder inert gases introduced at 33. The combustion vessel 32 is thermally insulated to reduce heat loss and can have heat added at 34 as needed to help maintain the desired catalyst temperature.

The catalyst bed should be warmed slowly to dry the catalyst, after which the burnoff temperature should be at least about 800° F. The maximum allowable temperature in the catalyst bed is about 900° F. to avoid sintering damage to the catalyst substrate. Initially 5–10% air in nitrogen is passed over the heated catalyst bed. The burning front travels over the entire bed, with the temperature preferably maintained between 840° and 860° F. The air concentration in nitrogen is slowly increased to 30%, or to about 5% oxygen. The carbon burnoff procedure is contained until no carbon dioxide or carbon monoxide can be detected in the exit gas 35, which requires at least about 16 hours and usually not over 24 hours. The rate of gas flow for carbon burn-off should be 20–30 SCFH per 100 grams catalyst. The catalyst particles are removed at 36 and can be returned to the reaction process at 10 for reuse. Thus acid treatment of the spent catalyst followed by washing and carbon burnoff provides an effective regenerated catalyst. For catalyst having pore diameters in the range of 35–90 angstrom units, it is found that these pores are appreciably enlarged during the process. The regenerated catalyst usually must be presulfided before reuse.

Figure 2:
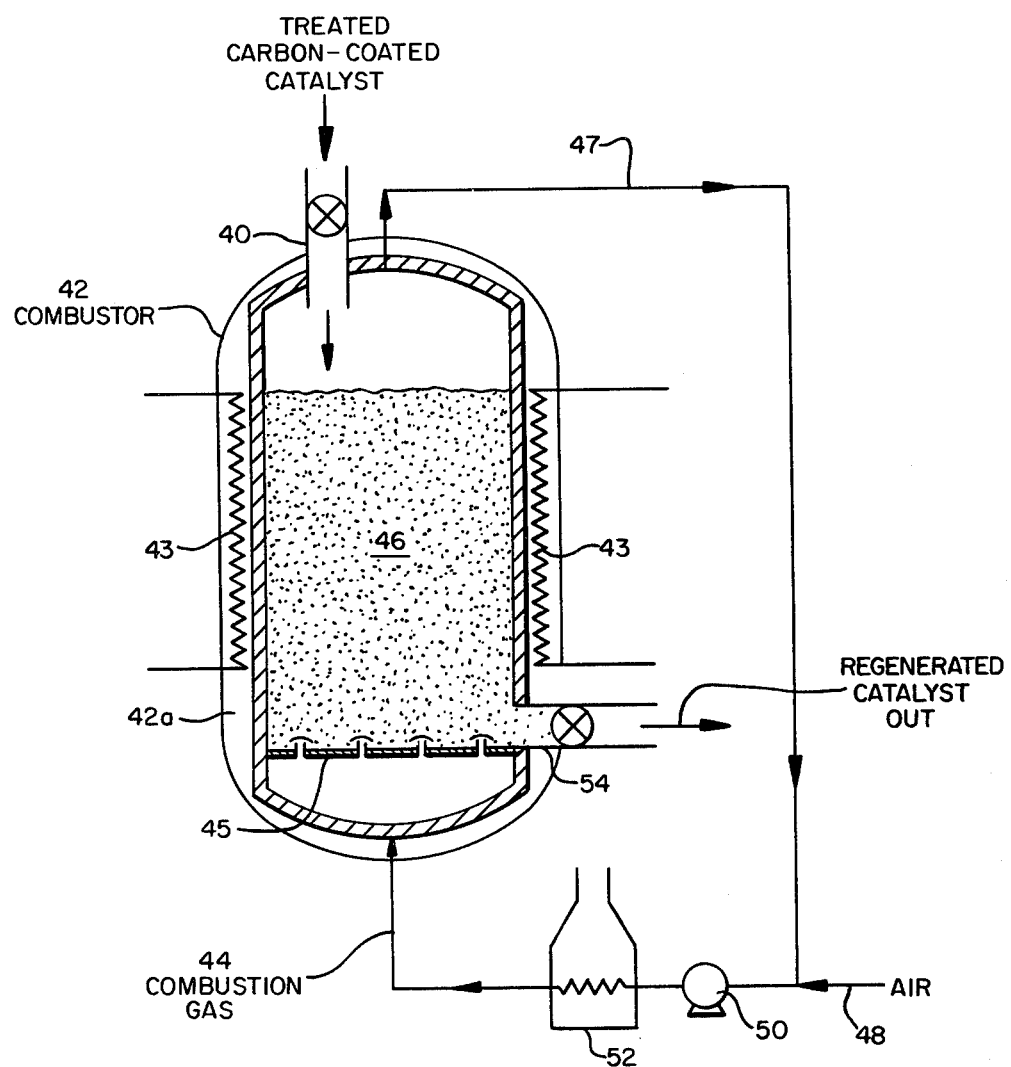
FIG. 2 is a process flow diagram showing preferred carbon burn-off procedures for the treated catalyst.

A preferred process for the catalyst carbon burnoff is shown in FIG. 2. Following acid treatment to remove metals deposits and a washing step, the carbon-containing catalyst at 40 is placed in combustor 42, which has thermal insulation 42a to reduce heat losses and can have heating means, such as electric heaters 43 incorporated therein. A combustion gas containing 1–6% oxygen is introduced at 44, through catalyst support and flow distributor means 45, and is passed upwardly through the catalyst bed 46. The catalyst temperature is maintained therein at 800°–850° F. to substantially burn off the carbon deposits.

The hot exit gas is removed at 47, air is added at 48, and the mixture is recycled by compressor 50, through heater 52 to conduit 44 for reuse. After the carbon burn-off from the catalyst has been completed, such as after 16–24 hours, the regenerated catalyst is removed at 54 for reuse in a catalytic process.

The invention will be further illustrated by reference to the following examples of catalyst regeneration by acid treatment and carbon-burnoff, and should not be construed as limiting the scope of the invention.

EXAMPLE 1

A quantity of 1/16 inch diameter extrudate spent catalyst removed from an ebullated bed reactor in an H-Coal hydrogenation process was washed in toluene solvent to remove the process oil. The catalyst was designated HDS-1442A and had characteristics as given in Table 1 below.

TABLE 1

| CHARACTERISTICS OF HDS-1442A CATALYST | | |
|---|---|---|
| | FRESH CATALYST | SPENT OIL-FREE CATALYST |
| Colbalt, W % | 2.4 | 1.68 |
| Molybdenum, W % | 9.15 | 6.28 |
| Carbon, W % | 0 | 16.7 |
| Bulk Density, lb/ft$^3$ | 36 | — |
| Pore Volume, cc/gm | 0.69 | 0.28 |
| Surface Area, M$^2$/gm | 339 | 128 |
| Crush Strength, lb/mm$^3$ | 3.0 | — |

A sample of the oil-free catalyst was placed in a container with 20% sulfuric acid in water solution. The catalyst and acid mixture was gently stirred and was maintained at about 180° F. temperature for about 20 minutes. Metals in the spent HDS-1442A catalyst (from H-Coal ™ process Run 130-82) before and after the acid treatment are provided in Table 2 below.

TABLE 2

| METALS IN OIL-FREE SPENT CATALYST, W % | | |
|---|---|---|
| Metals | Catalyst Before Acid Treatment | After Acid Treatment at 180° F. for 20 minutes |
| Titanium | 1.93 | 1.28 |
| Iron | 0.32 | 0.11 |
| Calcium | 0.44 | 0.06 |
| Sodium | 0.79 | 0.07 |
| Molybdenum | 6.28 | 6.4 |
| Cobalt | 1.68 | 1.66 |

It is seen that the amount of titanium, iron, calcium and soldium metals deposited on the spent catalyst are substantially reduced by the acid treatment, while the molybdenum and cobalt remained essentially unchanged.

EXAMPLE 2

Metals in the spent HDS-1442A catalyst from a similar H-Coal Process (Run 130-88) before and after acid treatment are given in Table 3.

TABLE 3

METALS IN OIL-FREE SPENT AND TREATED CATALYST, W %

| Metals | Catalyst Before Acid Treatment | After Acid[1] Treatment at 70° F. for 2 hours | After Acid[2] Treatment at 180° F. for 45 minutes | After Acid[3] and Ammonium Ion Treatment at 180° F. for 45 minutes | After Acid[4] and Ammonium Ion Treatment at 180° F. for 20 minutes |
|---|---|---|---|---|---|
| Titanium | 2.4 | 1.9 | 2.15 | 1.63 | 1.84 |
| Iron | 1.25 | 0.32 | 0.28 | 0.25 | 0.19 |
| Calcium | 0.67 | 0.55 | 0.14 | 0.14 | 0.2 |
| Sodium | 0.76 | 0.31 | 0.2 | 0.16 | 0.14 |
| Molybdenum | 7.0 | 6.74 | 7.0 | 7.05 | 7.3 |
| Cobalt | 1.73 | 1.23 | 1.51 | 1.55 | 1.74 |

[1] 30 W % sulfuric acid
[2] 20 W % sulfuric acid
[3] 20 W % sulfuric acid and 0.15 W % ammonium ion
[4] 20 W % sulfuric acid and 0.7 W % ammonium ion Based on the above results, it is noted that the removal of metal deposits by acid treatment is more effective at temperatures of 180° F. than at ambient temperature (70° F.), while the cobalt and molybdenum metals in the catalyst remain essentially unchanged. Also, it is noted from Table 3 that partial removal of titanium (Ti) can be increased by adding 0.1–1.0% ammonium sulfate to the sulfuric acid solution for treatment of oil-free spent catalyst.

EXAMPLE 3

A sample of spent catalyst was obtained from an H-Oil TM operation on a petroleum feedstock (Run 130-96-8), and was washed with toluene solvent and then treated with 25% sulfuric acid solution at 190° F. for 20 minutes. The data results in Table 4 show that considerable amounts of vanadium and nickel deposits were removed, while the active elements molybdenum and cobalt in the catalyst were not appreciably affected. Further optimization of the operating conditions for acid treatment would result in even more effective removal of the vanadium and nickel contaminants.

TABLE 4

METALS IN OIL-FREE SPENT CATALYST, W %

| Metals, | Catalyst Before Acid Treatment | Catalyst After Acid Treatment |
|---|---|---|
| Vanadium | 2.7 | 0.8 |
| Nickel | 1.01 | 0.48 |
| Molybdenum | 5.7 | 5.67 |
| Cobalt | 1.7 | 2.3 |

EXAMPLE 4

After metals removal, spent catalyst was further regenerated by carbon burnoff. The acid-treated catalyst samples were placed in a fixed bed combustor apparatus and subjected to carbon burnoff treatment. The catalyst bed temperaure was heated to between 840° and 850° F., with the maximum allowable temperature in the catalyst bed being 850° F. to avoid damage to the catalyst support structure. Initially 5–10% air in nitrogen was passed over the heated catalyst bed, and the burning front travelled through the entire bed from top to bottom with the catalyst temperature maintained between 840°–850° F. The air concentration in nitrogen gas was slowly increased to 30%, or about 5% oxygen. The carbon burnoff procedure was continued for 20 hours until no carbon dioxide and carbon monoxide was detected in the exit gas. The rate of gas flow for carbon burnoff of 100 gms catalyst sample was 24 SCFH.

The analyses of two catalyst samples before and after acid treatment and after carbon burnoff steps are presented in Table 5. Similarly, as in the previous examples, the deposited metals, iron, titanium, calcium, and sodium are reduced substantially, while the active metals cobalt and molybdenum remain essentially unchanged. Acid treatment of the spent catalyst followed by carbon burnoff provides the regenerated catalyst, which has slightly increased pore volume as compared to the fresh HDS-1442A catalyst.

TABLE 5

ANALYSES* OF CATALYST SAMPLES

| CATALYST SAMPLE | Fe | Ti | Ca | Na | Mo | Co | Carbon W % | Pore Volume cc/gm | Surface Area M²/gm | Crushed Strength lb/mm³ |
|---|---|---|---|---|---|---|---|---|---|---|
| Fresh HDS-1442A Catalyst | | | | | 9.15 | 2.4 | | 0.69 | 339 | 3.0 |
| Oil-Free Spent Catalyst from H-Coal Run No. 130-82 | 0.32 | 2.4 | 0.44 | 0.79 | 6.28 | 1.68 | 16.7 | 0.28 | 128 | |
| Acid Treated Spent Catalyst from Run No. 130-82 | 0.11 | 1.67 | 0.06 | 0.07 | 6.4 | 1.66 | | | | |
| Spent Catalyst (Run No. 130-82) After Acid Treatment and | | | | | 8.45 | | 0.1–0.3 | 0.7 | 235 | |

TABLE 5-continued

ANALYSES* OF CATALYST SAMPLES

| CATALYST SAMPLE | Metals, W % | | | | | | Carbon W % | Pore Volume cc/gm | Surface Area $M^2/gm$ | Crushed Strength $lb/mm^3$ |
| --- | --- | --- | --- | --- | --- | --- | --- | --- | --- | --- |
| | Fe | Ti | Ca | Na | Mo | Co | | | | |
| Carbon Burnoff Oil-Free Spent Catalyst from H-Coal Run No. 130-88 | 1.25 | 2.4 | 0.67 | 0.76 | 7.0 | 1.73 | 18.1 | | | |
| Acid Treated Spent Catalyst Sample from Run 130-88 | 0.19 | 1.84 | 0.2 | 0.14 | 7.3 | 1.74 | | | | |
| Spent Catalyst (Run No. 130-88) After Acid Treatment and Carbon Burnoff | | | | | | | 0.1–0.3 | 0.72 | 235 | 2.4 |

*All the analyses are on "as is basis"

A comparison made of the pore size distribution for the fresh catalyst, toluene-extracted regenerated catalyst and acid-treated regenerated catalyst showed the following results:

(a) The average pore diameter in the range of 60–90 angstrom units for the fresh catalyst was increased to 110–130 angstroms for acid-treated and regenerated catalyst. This increase in average pore diameter was due mainly to conversion of the 35 to 78 Å diameter range pores in fresh catalyst to 58–180 Å diameter pores in the regenerated catalyst, as a result of the H-Coal reaction process and the carbon burnoff step. Another reason for the increase in catalyst pore diameters was due to removal of metallic impurities from the larger diameter pores.

(b) Acid-treatment alone does not have a significant effect in increasing the average pore size diameter of the regenerated catalyst.

EXAMPLE 5

Catalysts which were regenerated by acid treatment for metals removal and carbon burnoff in accordance with this invention were reused in coal hydrogenation activity tests, in comparison with fresh catalysts. The catalyst batch test screening results and continuous aging test results are presented in Tables 6, 7, and 8. In general, the results showed that the activity for the regenerated catalyst was substantially the same as for fresh catalyst.

Table 6 shows the results of batch screening activity runs made on coal liquid in a bench-scale autoclave using regenerated and fresh pulverized HDS-1442A catalyst. These results show that toluene-soluble conversion, hydrogenation and denitrogenation activity are essentially the same for the regenerated and fresh catalyst, and that desulfurization and deoxygenation activity of the regenerated catalyst are somewhat higher than for the fresh catalyst.

TABLE 6
BATCH SCREENING ACTIVITY RESULTS FOR REGENERATED VS. FRESH CATALYST

| Catalyst | Toluene-Soluble Conversion | Hydrogen/Carbon Atomic Ratio | W % Sulfur in Product | W % Nitrogen in Product | W % Oxygen in Product |
| --- | --- | --- | --- | --- | --- |
| Acid-Treated 1442A After carbon burnoff | 58.6 | 1.00 | 1.43 | 1.48 | 7.40 |
| Fresh 1442A (Recent Run) | 56.2% | 1.04 | 1.49 | 1.47 | 7.80 |
| Fresh 1442A (Average) | 57.1 ± 2.6 | — | 1.58 ± 0.13 | 1.54 ± 0.23 | — |

Table 7 shows the comparison of benzene-insoluble results from continuous flow coal hydrogenation operations using spent HDS-1442A catalyst regenerated by the procedure of this invention, as compared with operations using fresh Amocat 1A catalyst, which is an improved catalyst developed for coal hydrogenation processes. This comparison was made on coal liquid using continuous catalyst aging tests using spinning basket type autoclaves. It is noted that based on the benezene-insoluble materials remaining in the product after the catalytic reaction, the regenerated catalyst is quite comparable to the fresh Amocat 1A catalyst up to about 200 hours operation. It was further observed that the hydroconversion activity results for acid-treated regenerated catalyst was higher than that for fresh HDS-1442A catalyst activity.

TABLE 7
BENZENE-INSOLUBLE DATA FROM CONTINUOUS FLOW COAL LIQUEFACTION RUN

| Period | Acid Treated Regenerated HDS-1442A Catalyst Benzene Insolubles, W % | Fresh Amocat 1A Catalyst Benzene Insolubles, W % |
| --- | --- | --- |
| 2 | 8.15 | 6.68 |
| 4 | 8.42 | 9.37 |
| 6 | 9.2 | 9.83 |
| 8 | 9.38 | 9.68 |
| 10 | 9.72 | 9.67 |
| 12 | 9.96 | 9.98 |
| 14 | 10.36 | 10.11 |
| 16 (160 hr) | 10.30 | — |
| 17 (200 hr) | 10.73 | — |

Other results of these comparison runs made using catalyst samples contained in a spinning basket type reactor are shown in Table 8, which compares average results for days 12–16 of hydrogenation operation on coal feed.

TABLE 8

| Elements Remaining in Reacted Coal-Derived Liquid | Acid-Tested Regenerated HDS-1442A Catalyst | Fresh Amocat 1A Catalyst |
|---|---|---|
| Carbon | 88.74 | 88.63 |
| Hydrogen | 7.46 | 7.34 |
| Sulfur | 0.47 | 0.49 |
| Nitrogen | 1.01 | 1.06 |
| Oxygen | 2.06 | 2.29 |

It is noted that the concentrations of carbon, hydrogen, sulfur, nitrogen and oxygen in the liquid product are such that the regenerated catalyst has somewhat improved activity for hydrogenation, desulfurization, denitrogenation and deoxygenation compared to that of a competitive fresh catalyst intended for coal hydrogenation processes.

Although I have disclosed certain preferred embodiments of my invention, it is recognized that various modifications can be made thereto, all within the spirit and scope of the invention and as defined solely by the following claims.

I claim:

1. A process for removing metal contaminants of iron, titanium, calcium, sodium, vanadium and nickel from particulate hydrogenation catalysts used in coal liquefaction and petroleum residua conversion processes, comprising:
    (a) washing the used catalyst with a hydrocarbon solvent to remove process oils;
    (b) treating the oil-free catalyst with an aqueous solution consisting of sulphuric acid and an ammonium ion which converts the metal contaminants to their respective sulfate compounds and at a temperature within the range of 60°-250° F. for at least about 5 minutes to remove the metal contaminants from the catalysts;
    (c) washiing the treated catalyst to remove the aqueous solution; and
    (d) processing the washed, treated catalyst further by carbon burnoff at a temperature of 800°-900° F. using 1-6 V % oxygen in an inert gas mixture to remove carbon deposits, thereby providing a regenerated catalyst.

2. The process of claim 1, wherein the aqueous solution used for treating the oil-free catalyst is 5-50 W % sulfuric acid and 0-10 W % ammonium ion.

3. The process of claim 1, wherein the catalyst treating time is 5-120 minutes.

4. A process for removing metal contaminants of iron, titanium, calcium, sodium, vanadium and nickel from particulate hydrogenation catalysts used in coal liquefaction and petroelum residua conversion processes, comprising:
    (a) washing the used catalyst with a hydrocarbon solvent to remove process oils;
    (b) washing the oil-free catalyst with water to substantially fill the catalyst pores with water;
    (c) treating the catalyst having pores substantially water filled with an aqueous acid solution which removes the metal contaminants and at a temperature within the range of 60°-250° F. for at least about 5 minutes to remove metal contaminants from the catalyst;
    (d) washing the treated catalyst with a polar solvent to remove the aqueous solution; and
    (e) processing the washed, treated catalyst further by carbon burnoff at a temperature of 800°-900° F. using 1-6 V % oxygen in an inert gas mixture to remove carbon deposits, thereby providing a regenerated catalyst.

5. The process of claim 4, wherein the acid is selected from the group consisting of sulfuric, sulfonic, nitric, acetic and citric acids.

6. A process for removing metal contaminants of iron, titanium, calcium, sodium, vanadium and nickel from particulate hydrogenation catalysts used in coal liquefaction and petroleum residua conversion processes, comprising:
    (a) washing the used catalyst with a hydrocarbon solvent to remove process oils;
    (b) treating the oil-free catalyst with a 5-20 W % aqueous solution of ammonium peroxydisulfate which converts metal contaminants to their respective sulfate compounds and at a temperature within the range of 60° to 150° F. for at least about 5 minutes to remove the metal contaminants from the catalyst;
    (c) washing the treated catalyst to remove the aqueous solution; and
    (d) processing the washed catalyst further by carbon burnoff at a temperature of 800°-900° F. using 1-6 V % oxygen in an inert gas mixture to remove carbon deposits, thereby providing a regenerated catalyst.

* * * * *